United States Patent Office 3,657,335
Patented Apr. 18, 1972

3,657,335
PROCESS FOR PREPARING 1,12 DODECANEDIOIC ACID
Charles N. Winnick, Teaneck, N.J., assignor to Halcon International, Inc.
No Drawing. Filed May 13, 1968, Ser. No. 728,808
Int. Cl. C07c 55/04
U.S. Cl. 260—533 C
3 Claims

ABSTRACT OF THE DISCLOSURE

This invention relates to the preparation of dodecanedioic acid 1,12 by the direct nitric acid oxidation of cyclododecene epoxide.

---

This invention relates to a new process for the preparation of dibasic acids. More particularly this invention relates to a process for preparing dodecanedioic acid-1,12. Still more particularly this invention relates to a process for preparing this dibasic acid from its corresponding cycloalkene epoxide, which epoxide has been prepared from cyclododecatriene 1,5,9 (C.D.T.).

In the past it has been common practice to utilize as a precursor to the dibasic acid the cyclic alcohol, ketone or glycol. In the preparation of dodecanedioic acid for example, 1,5,9, cyclododecatriene has been epoxidized with peracids to form the mono epoxide which has been hydrogenated to cyclododecanol. This hydrogenation requires rather vigorous conditions—for example, high temperature and pressure primarily to bring about reduction of the epoxy group. In this instance 3 moles of hydrogen are required. Alternatively, the mono epoxide has been hydrogenated to the saturated epoxide compound, catalytically rearranged to the ketone and finally oxidized with nitric acid to the dibasic acid, or the mono epoxide has been hydrolyzed to the corresponding glycol, then hydrogenated to the saturated glycol and finally oxidized with nitric acid to the dibasic acid.

In all of these methods known to the art, additional processing steps and/or hydrogen consumption have been necessary to prepare the dibasic acid precursor. We have found that the cyclododecene epoxide itself can be oxidized to the dibasic acid. The advantages of this are immediately obvious. The following table illustrates the prior art reaction sequence compared to our reaction sequence:

MY PROCESS

C.D.T. ──→ epoxydiene ──→ cyclododecene ──→ D.D.A;
(1)         (2)            epoxide        (3)

(1) Epoxidation
(2) Hydrogenation under mild conditions (2 moles)
(3) Oxidation with nitric acid

PRIOR ART PROCESS

```
              Saturated epoxy compound ──→ Ketone
              (2)                          (5)
                                                  │ (7)
C.D.T.──→ epoxydiene ──→ alcohol ──→(7)           │
(1)                (4)                            │
                                                  ↓ D.D.A;
    │                                            ╱
    ↓ (3)                                       ╱
                                               ╱
        glycol ──→ saturated      (7)
        (6)        glycol
```

(1) Epoxidation
(2) Hydrogenation (2 moles)
(3) Hydrolysis
(4) Hydrogenation (3 moles)
(5) Rearrangement
(6) Hydrogenation (2 moles)
(7) Oxidation with nitric acid Accordingly, I have found a new process for preparing the dibasic acid which utilizes an epoxide precursor, heretofore not employed in the direct preparation of this dibasic acid. More specifically I have found that cyclododecatriene 1,5,9 may be epoxidized to 1,2 epoxy - 5,9- cyclodecadiene which in turn may be hydrogenated to the cyclododecene epoxide precursor and subsequently directly oxidized to dodecanedioic acid-1,12 (D.D.A.).

In addition to the unique feature of using an epoxide precursor to form directly, the desired dibasic acid, this new process allows for several advantages over the prior art. In one process of the prior art, vigorous conditions are required to hydrogenate the epoxide compound to cyclododecanol. In those processes wherein the vigorous hydrogenation is avoided 4 individual steps are required to form the dibasic acid from 1,5,9 cyclododecatriene. In our process we are able to avoid the vigorous hydrogenation conditions while at the same time carry out our process in only three steps.

In accordance with my invention, therefore, 1,5,9 cyclododecanetriene is epoxidized to 1,2-epoxy-5,9-cyclododecadiene, which in turn is hydrogenated to cyclododecene epoxide and subsequently oxidized to dodecanedioic acid.

The epoxidation of 1,5,9 cyclododecatriene to 1,2-epoxy-5,9-cyclododecadiene may be carried out under a variety of methods as shown by the prior art. However, it is preferred to use organic hydroperoxides especially in the presence of an epoxidation catalyst. In its broad aspects the organic hydroperoxide may be a ROOH compound where R is an organic radical. This organic radical is not a critical feature of this invention and, therefore, may suitably be a substituted or unsubstituted alkyl, aralkyl, cycloaralkyl, aralkenyl, hydroxy aralkenyl, cycloaralkenol, hydroxy cycloaralkenol and the like having from about 3 to 20 carbon atoms. In addition R may also be a heterocyclic group. Useful and preferred hydroperoxides are ar-lower alkyl hydroperoxides such as cumene hydroperoxide and ethylbenzene hydroperoxide, lower alkyl hydroperoxides such as tertiary butyl hydroperoxide, Tetralin hydroperoxide, methylcyclohexene hydroperoxide and the like as well as the hydroperoxides of toluene, p-ethyl toluene, isobutylbenzene, di-isopropyl benzene, p-isopropyl toluene, o-xylene, m-xylene, p-xylene, phenyl cyclohexane and the like. The more preferred hydroperoxides are the alkyl and aralkyl hydroperoxides especially tertiary butyl hydroperoxide or ethylbenzene hydroperoxide.

The epoxidation may be carried out in the presence of a catalytic amount of molybdenum, tungsten, titanium, columbium, tantalum, rhenium, selenium, chromium, zirconium, tellurium, uranium or vanadium catalyst and admixtures thereof. The catalyst may be employed in the form of compounds or in its metal state. Suitable compounds may include inorganics such as the various oxides as well as the organometallic compounds. Illustrative of such forms are various chelates, association compounds and enol salts. Specific preferred catalytic compounds of this type for use in the invention are the naphthenates and carbonyls of molybdenum, titanium, tungsten, rhenium, columbium, tantalum, selenium, chromium, zirconium, telurium and uranium. In the most preferred aspects of this invention the catalysts are molybdenum, tungsten or titanium and the corresponding organo metallic compounds and especially molybdenum. The amount of catalyst employed may vary over a wide range, as for example from .000001 mole per mole of hydroperoxide to amounts over 1 mole; however, it is preferred to use from .002 to .03.

If it is desired a basic material may also be advantageously employed with the catalyst in this reaction. Bases both organic and inorganic such as alkaline and alkaline earth metals and organic acid compounds and the like may be employed. Particularly, the sodium, potassium, lithium, calcium and magnesium compounds and especially, those bases which are soluble in the reaction medium. The bases may be employed in any desired concentration such as .05 mole per mole of catalyst. Preferably, however, .25 to 3.0 and especially .5 to 1.5 moles per mole of catalyst is employed.

The epoxidation reaction may be carried out with or without a solvent and although any inert solvent may be employed it is preferred to use such solvents as benzene, ethyl benzene, tertiary butanol, isopropanol cyclohexane or cyclododecane and especially tertiary butanol.

The epoxidation may be carried out at temperatures of 20 to 175° and preferably from 40 to 140°. The molar ratio of olefin to hydroperoxide compound may be from .5/1 to 100/1 preferably 1/1 to 20/1 and especially 3/1 to 10/1. The reaction may be suitably carried out over a large pressure range such as 1 to 50 atmospheres although it is preferred to carry out this reaction from 1 to 3 atmospheres.

As a by-product of this reaction step an ROH alcohol is formed. This alcohol may be reconverted to prepare additional ROOH compounds or may be used as such for other purposes such as a solvent. The 1,2-epoxy 5,9-cyclododecadiene thus formed is hydrogenated to the corresponding saturated epoxy compound. Any one of several well-known hydrogenation techniques may be employed for this reaction. Preferably, however, hydrogenation is carried out with a Pt, Pd or Ni catalyst at 20–150° C. and 50–500 p.s.i.g. but preferably 50 to 100° C. and 100 to 300 p.s.i.g.

The cyclododecene epoxide thus formed is oxidized with $HNO_3$ under conditions well known for the oxidation of the corresponding alcohols or ketones. For example, the epoxide is subjected to $HNO_3$ oxidation in the presence of a suitable catalyst. The reaction may be effected at a temperature between 60° and 100° C. The nitric acid solution may be of 30–70% strength, preferably 50–70% strength, containing a suitable catalyst. Although various catalysts may be used preferred catalysts are mixtures containing dissolved copper or its salts and dissolved vanadium or manganese or its salts. The total concentration of catalyst being in the range of 0.01–5.0 weight percent, based on nitric acid solution, but preferably 0.2 to 3.0 weight percent. In all of the above steps, the unreacted material of each step may if desired be removed prior to the subsequent reaction by a variety of well known means.

The following examples are given by way of illustration:

EXAMPLE 1

1,2-epoxy-5,9-cyclododecadiene

To 162 g. (1 mole) of 1,5,9 cyclododecatriene consisting mainly of the cis-trans-trans isomer is added a solution of 30 g. (0.33 mole) tertiary butyl hydroperoxide in 30 g. of t-butanol. Molybdenum napthenate is added so as to have a concentration of 100 p.p.m. of Mo. The mixture is heated at 90° C. for three hours. Hydroperoxide conversion is 99% and selectivity to epoxydiene based on hydroperoxide is 92%. Selectivity based on 1,5,9 cyclododecatriene is 96%. The epoxydiene, B.P. 98° C. at 2 mm. is separated from unreacted 1,5,9 cyclododecatriene and t-butanol by distillation.

EXAMPLE 2

1,2-epoxy-5,9-cyclododecadiene

To 81 g. (0.5 moles) of 1,5,9 cyclododecatriene consisting of a mixture, of the cis-trans-trans and all trans isomers is added 13.8 g. of ethylbenzene hydroperoxide (0.1 moles) in 100 g. of ethylbenzene. Molybdenum carbonyl is added so as to have 50 p.p.m. of Mo in the solution which is then heated at 110° C. for one hour. Hydroperoxide conversion is 100% and selectivity to epoxydiene based on hydroperoxide is 95%. Selectivity based on 1,5,9 cyclododecatriene is 98%.

EXAMPLE 3

Cyclododecene epoxide

To 50 g. of 1,2-epoxy cyclododecadiene-5,9 in 200 ml. of ethanol is added 1 g. of 5% Pt on C and the mixture hydrogenated at 100 p.s.i.g. and a temperature of 50° C. for two hours. The effluent contains 98% cyclododecene epoxide after removal of solvent.

EXAMPLE 4

Dodecanedioic acid-1,12

The nitric acid reagent is made by dissolving 2.5 g. $NH_4VO_3$ and 7.5 g. copper metal in a mixture of 430 g. 70% $HNO_3$ and 70 g. water. The cyclododecene oxide is added slowly at 70–74° C. A total of 50 g. (.275 mole) is added over a period of one hour. The reaction is held at 70–72° C. for ten minutes longer, cooled, filtered and the solids washed with 50 ml. of cold water. The yield of crude dodecanedioic acid is 29.2 g. (46.2%) (M.P. 125–6 after recrystallization from water).

What is claimed is:
1. A process for preparing dodecanedioic acid-1,12, which comprises in combination the steps of:
 (a) epoxidizing 1,5,9 cyclododecatriene in the presence of an ar-lower alkyl hydroperoxide or lower alkyl hydroperoxide and a molybdenum, tungsten, titanium, columbium, tantalum, rhenium, selenium, chromium, zirconium, tellurium, uranium or vanadium catalyst, to form 1,2 - epoxy - 5,9 - cyclododecadiene;
 (b) hydrogenating said 1,2-epoxy-5,9-cyclododecadiene under mild conditions in the presence of a hydrogenation catalyst to form cyclododecene epoxide; and
 (c) oxidizing said cyclododecene epoxide in the presence of nitric acid to form the desired product.

2. The process of claim 1 wherein step (a) is carried out in the presence of an ar-lower alkyl hydroperoxide or lower alkyl hydroperoxide and a molybdenum, tungsten, titanium, columbium, tantalum, rhenium, selenium, chromium, zirconium, tellurium, uranium or vanadium catalyst, step (b) is carried out in the presence of Pt, Pd or Ni and step (c) is carried out in the presence of 30–70% $HNO_3$.

3. The process of claim 2 wherein step (a) is carried out at temperatures of from 40–140° C., step (b) is carried out at temperatures of 40 to 150° C. and pressures of 15 to 300 p.s.i.a., and step (c) is carried out at temperatures of 60 to 110° C.

References Cited
UNITED STATES PATENTS 3,087,963  4/1963  Wiese et al. _____ 260—533 CX JAMES A. PATTEN, Primary Examiner R. O'KELLY, Assistant Examiner